United States Patent [19]

Patel

[11] Patent Number: 4,716,514

[45] Date of Patent: Dec. 29, 1987

[54] SYNCHRONOUS POWER RECTIFIER

[75] Inventor: Raoji Patel, Framingham, Mass.

[73] Assignee: Unitrode Corporation, Lexington, Mass.

[21] Appl. No.: 910,313

[22] Filed: Sep. 22, 1986

Related U.S. Application Data

[63] Continuation of Ser. No. 681,016, Dec. 13, 1984, abandoned.

[51] Int. Cl.$^4$ .................................... H02M 7/217
[52] U.S. Cl. .................................. 363/127; 363/89
[58] Field of Search .................. 323/282, 289; 363/89, 363/127

[56] References Cited

U.S. PATENT DOCUMENTS

| 3,313,996 | 4/1967 | Lingle | 363/127 |
| 3,581,186 | 5/1971 | Weinberger | 363/127 |
| 3,733,540 | 5/1973 | Hawkins | 363/89 |
| 3,835,368 | 9/1974 | Williams | 323/282 |
| 3,851,240 | 11/1974 | Park et al. | 363/127 |
| 3,930,196 | 12/1975 | Park et al. | 363/127 |
| 4,016,461 | 4/1977 | Roland | 323/282 |
| 4,493,017 | 1/1985 | Kammiller et al. | 323/289 |

FOREIGN PATENT DOCUMENTS

| 0109174 | 8/1980 | Japan | 363/127 |
| 0847305 | 7/1981 | U.S.S.R. | 363/89 |

OTHER PUBLICATIONS

Gunn, IBM Technical Disclosure Bulletin, vol. 13, No. 5, p. 1393, Oct. 1970.
Milewski, IBM Technical Disclosure Bulletin, vol. 20, No. 11A, pp. 4272-4275, Apr. 1978.
Patel, "Using Bipolar Synchronous Rectifiers Improve Power Supply Efficiency", Power Sources Conference, Nov. 1984.
Blanchard, "MOSFET's, Schottky Diodes viz for Low-Voltage Supply Designs", E.D.N., Jun. 28, 1984.
Ruble; "Bilateral MOSFET's Solve a Range of AC Control Problems", Electronic Design; Aug. 23, 1984; pp. 211-214+.

Primary Examiner—Peter S. Wong
Assistant Examiner—Jeffrey Sterrett
Attorney, Agent, or Firm—Weingarten, Schurgin, Gagnebin & Hayes

[57] ABSTRACT

A synchronous power rectifier incorporating a bipolar power transistor operable in a switching mode to rectify the energy from a secondary winding of a power transformer. The synchronous rectifier reduces or eliminates the need of rectifier diodes, which provides power rectification without the power loss associated with the rectifier diode voltage drops. Moreover, the present invention includes further refinements of the circuit, including adjustment of the rectifier switching time to accommodate delayed turn-off times of bipolar power devices, and adjustment of the switching signal duration to provide output voltage regulation independent of the excitation of the transformer primary. The resulting embodiments of the present invention provide a modular switching power supply circuit of high efficiency, which may be operable together in combination to provide multiple output voltages.

6 Claims, 3 Drawing Figures

SYNCHRONOUS POWER RECTIFIER

This application is a continuation of application Ser. No. 681,016, filed Dec. 13, 1984, now abandoned.

FIELD OF THE INVENTION

The present invention relates to power rectifier circuits, and in particular synchronous power rectifiers incorporating bipolar switching transistors.

BACKGROUND OF THE INVENTION

In an off-line, switching regulated voltage power supply for applications such as high-density CMOS logic, high-speed ECL logic, etc., the power dissipated in the output rectifiers accounts for at least 20–30 percent of the total input power. Losses from silicon rectifiers could be reduced by substitution of power Schottkty rectifiers. However, even with Schottky rectifiers, the power dissipated causes a significant reduction in power supply efficiency.

Synchronous rectifiers, although well known in low-power signal applications, have generally been impractical for power applications. Bipolar transistors have previously exhibited high saturation resistance, and required significant base drive current. Moreover, the reverse breakdown characteristics were unsuitable for power rectification. Furthermore, the storage time exhibited by previously available bipolar transistors was excessive for useful high-frequency switching regulators.

Alternately, a power MOSFET devices may be used as switching elements. However, the power MOSFET devices presently known have a reverse breakdown characteristic similar to that of a diode (temperature-dependent, high forward drop) and therefore unattractive for this application.

SUMMARY OF THE INVENTION

The synchronous power rectifier of the present invention incorporates a bipolar device for operation therein (BISYN by Unitrode Corporation of Lexington, Mass., and novel circuitry operable to overcome limitations thereof. The salient features of the BISYN includes low saturation resistance ($R_{ce}(SAT)$) on the order of a few milli-ohms, low saturation voltage with high forced gain, ultra-fast switching times, and first and third quadrant switching capability. Moreover, the parameters of the BISYM have a lower temperature coefficient in comparison with power MOSFET. Moreover, the rectifier losses of the present semiconductor BISYN element is less than the Schottky, power MOSFET, and conventional silicon diode elements.

The synchronous rectifier circuitry of the present invention includes the further features which automatically adjust switching signals for BISYN switching times. The adjustment is responsive to the particular BISYN switching speed.

Various synchronous rectifier circuit topologies are shown which include a single-ended and push-pull synchronous rectifier. Moreover, circuit embodiments include pulse width modulation of the synchronous rectifier to achieve voltage regulation. The resulting circuits provide a power supply having significant improvement in efficiency and reduction in cost in comparison with currently available power supplies of other technologies.

BRIEF DESCRIPTION OF THE DRAWING

The features of the present invention mentioned above and further features can be better understood by reading the following detailed description, taken together with the drawing, wherein.

DETAILED DESCRIPTION OF THE INVENTION

Figure 1:
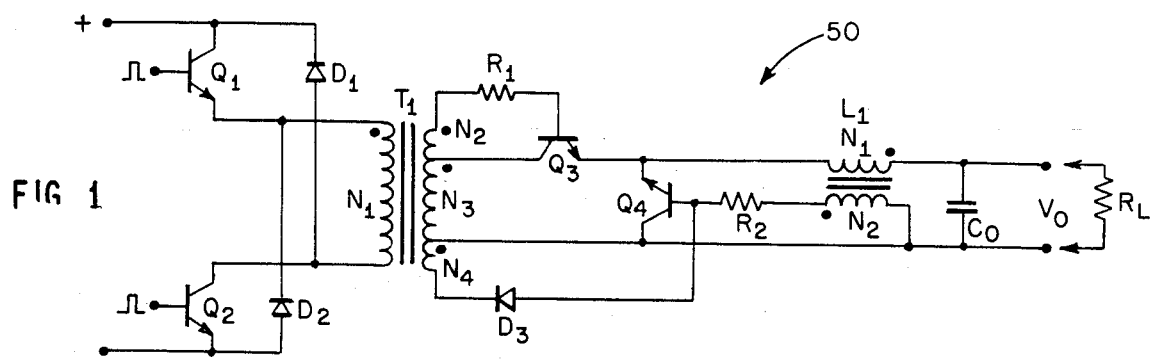
FIG. 1 is a schematic diagram showing a synchronous rectifier in a singleended circuit configuration.

A synchronous single-ended rectifier circuit 50 is shown in FIG. 1. The circuit is energized by causing transistor $Q_1$ and $Q_2$ to simultaneously conduct, thereby placing a flow of current through transistor $Q_1$, the primary winding having turns $N_1$ of transformer $T_1$, and through transistor $Q_2$ to the negative return. During periods between the energization of transistors $Q_1$ and $Q_2$, the inductance of the primary transformer $T_1$ will cause a flow of current to continue, wherein the flow is maintained through diodes $D_1$ and $D_2$. Transformer $T_1$ has a secondary winding including several sections having turns $N_2$, $N_3$, and $N_4$, which typically comprise a single winding having several taps thereon. Alternately, the various sections of the secondary of transformer $T_1$ may be formed from isolated sets of windings, and coupled to the respective circuit elements by appropriate coupling elements such as may be known in the art.

In operation, an output voltage $V_0$, delivered to load $R_L$, is produced across capacitor $C_0$ which is charged by a flow of current through inductor $L_1$ having a winding of turns $N_1$. The flow is supplied by transformer $T_1$ secondary section having turns $N_3$ through transistor $Q_3$ which is energized while transistors $Q_1$ and $Q_2$ are energized. The transistor $Q_3$ is energized by a driving voltage developed across secondary winding section having turns $N_2$ through resistor $R_1$.

When transistors $Q_1$ and $Q_2$ cease conducting, and the flow of current from the primary of transformer $T_1$ now flows through diodes $D_1$ and $D_2$, and transistor $Q_3$ is turned off. The inductor $L_1$, having a flow of current, will maintain a flow of current through transistor $Q_4$, which is energized by a signal produced by a second winding having turns $N_2$ on inductor $L_1$ through resistor $R_2$. Having begun a current flow through transistor $Q_4$, the flow would ordinarily continue, even after the transistors $Q_1$, $Q_2$, and $Q_3$ were once again energized, since transistor $Q_4$ is energized by a singal produced from the corresponding induced signal on the second winding of $L_1$. However, transistor $Q_4$ is turned off by a flow of current through diode $D_3$ from a secondary section having turns $N_4$, which removes the signal produced by the winding of inductor $L_1$, as well as depleting the charge storage from transistor $Q_4$. Moreover, as long as current is flowing through diode $D_3$ from transistor $Q_4$, a signal is produced in the secondary winding having turns $N_2$ which opposes the energization signal generated therein, which would otherwise energize transistor $Q_3$. When the flow of current through diode $D_3$ ceases, the energization signal for transistor $Q_3$ is generated in transformer $T_1$ secondary section having turns $N_2$, allowing transistor $Q_3$ to once again conduct. The complete cycle may therefore repeat indefinitely.

Figure 2:
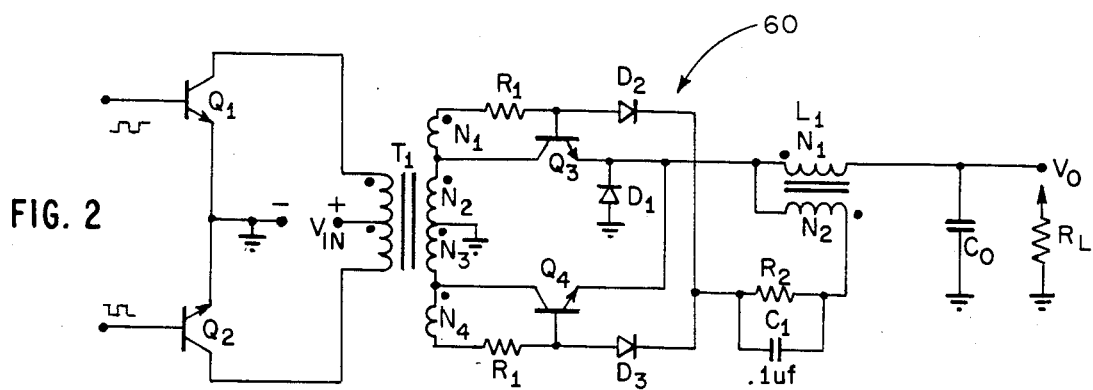
FIG. 2 is a schematic diagram showing the synchronous rectifier in a center tap output configuration.

A push-pull synchronous power rectifier circuit 60 is shown in FIG. 2. The energy is supplied by alternate energization of the primary winding of transformer $T_1$ by alternately energizing transistors $Q_1$ and $Q_2$, wherein the energization period of each transistor is substantially equal. The energization periods of transistor $Q_1$ and $Q_2$ together form substantially the entire time period of the energization cycle, except for short intervening periods called dead times, which allow the charge in transistors $Q_1$ and $Q_2$ to decay, thereby avoiding occurrences when both transistors $Q_1$ and $Q_2$ are simultaneously energized. An output voltage $V_0$, delivered to load $R_L$, is produced across capacitor $C_0$ by a current flowing through inductor $L_1$ in a manner similar to the circuit 50 above. The inductor $L_1$ is alternately energized by a flow of current from either secondary winding section having turns $N_2$ or $N_3$, according to respective energization of transistors $Q_3$ and $Q_4$. Transistors $Q_3$ and $Q_4$ are energized by signals generated by secondary sections having turns $N_1$ and $N_4$, respectively, and each signal passing through the resistor $R_1$. A second winding having turns $N_2$ on inductor $L_1$ provides a deenergization signal through $R_2$ to be selectively applied through didodes $D_2$ and $D_3$ to transistors $Q_3$ and $Q_4$, respectively. The signal thus applied enhances the turn-off characteristics of transistors $Q_3$ and $Q_4$ by depleting the charge stored within the respective base regions thereof. During the previously mentioned dead times, when neither transistors $Q_3$ and $Q_4$ are conductive, the current from inductor $L_1$ is provided through diode $D_1$, and such flow is maintained until either transistor $Q_3$ and $Q_4$ becomes conductive.

Figure 3:
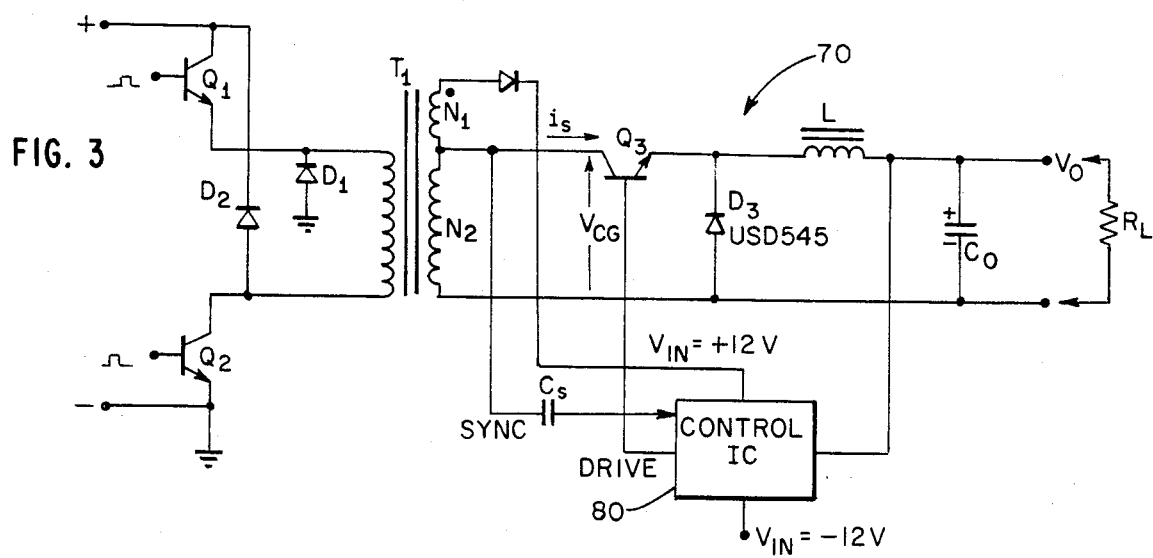
FIG. 3 is a schematic diagram showing the single-ended synchronous rectifier operable under pulse width modulation (PWM) regulator control.

A regulated power supply 70, incorporating pulse width modulation, is shown in FIG. 3. The transformer $T_1$ is energized in the same manner which the primary of transformer $T_1$ is energized in the circuit 50 of FIG. 1, above. Similarly, the output voltage $V_0$ is delivered to load $R_L$, and is produced across capacitor $C_0$ from a current flow through inductor L according to the selective energization of transistor $Q_3$ synchronously timed with the flow of current produced through secondary section $N_2$. During the periods when transistors $Q_1$ and $Q_2$ are not energized, and the flow of current through secondary section $N_2$ drops, the flow of current through the inductor L is maintained by diode $D_3$. The regulation of output voltage $V_0$ is provided by a control circuit 80 wherein the duration of the drive signal for transistor $Q_3$ is controlled by the output voltage as sensed by the control IC, according to pulse width modulation techniques generally known. Moreover, the control circuit 80 is synchronized through the energization of secondary section having turns $N_2$ by a signal provided by secondary section having turns $N_1$, so that the pulse width modulation occurs synchronously with the signal to be rectified.

Other embodiments of the present invention are within the scope of the present invention. For instance, the power supply of the present invention may embody various primary energization techniques as shown in FIGS. 1, 2, or 3, or otherwise known in the art. Moreover, the second transistor $Q_4$ of circuit 50 shown in FIG. 1 and the associated synchronous energization circuitry may also be incorporated in the circuits 60 and 70 of FIGS. 2 and 3, to replace diodes $D_1$ and $D_3$. Further embodiments, substitutions, and circuit changes by one skilled in the art are clearly within the present invention, which is not to be limited, except by the claims which follow.

What is claimed is:

1. A synchronous power rectifier comprising:
   a source providing a flow of current at periodic intervals;
   a first semiconductor device comprising a bipolar transistor connected to receive said flow of current from said source and being synchronously controlled by said source to pass said flow of current of one polarity during said period intervals;
   a capacitor;
   an inductor connected to said source and said capacitor to receive said flow of current and provide a charging current for said capacitor;
   a second semiconductor device connected to provide a second flow of current of said polarity from said inductor into said capacitor during time intervals wherein said first semiconductor device is not providing flow of current from said source wherein,
   said conductor includes a secondary winding connected to cause said second semiconductor device to provide said second flow of current, and
   said source provides a turn-off signal at periodic intervals, said synchronous power rectifier further comprising
   means to apply said turn-off signal to said second semiconductor element to cause it to turn off.

2. The synchronous power rectifier of claim 1, wherein
   said second semiconductor device comprises a selectively controlled bipolar semiconductor.

3. The synchronous power rectifier of claim 1, further including
   means connected to said second semiconductor for turning off said second semiconductor at theonset of said periodic intervals.

4. The synchronous power rectifier of claim 3, wherein
   said means for turning off said second semiconductor device further inhibits the conduction of said first semiconductor device until said second flow of current through said second semiconductor device ceases.

5. A synchronous power rectifier comprising:
   a source providing a flow of current at periodic intervals;
   a first semiconductor device comprising a bipolar transistor connected to receive said flow of current from said source and being synchronously controlled by said source to pass said flow of current of one polarity during said period intervals;
   a capacitor;
   an inductor connected to said source and said capacitor to receive said flow of current and provide a charging current for said capacitor;
   a second semiconductor device connected to provide a second flow of current from said inductor of said polarity into said capacitor during time intervals wherein said first semiconductor device is not providing flow of current from said source wherein,
   said source provides a plurality of periodic current flows in a sequence, said synchronous power rectifier further including
   a plurality of first semiconductor devices each connected to receive one of said plurality of current flows, said inductor includes a secondary winding and providing a turn-off signal, said synchronous power rectifier further comprising means to selectively apply said turn-off signal to the particular first semiconductor device in conduction during the immediately preceding periodic interval.

6. The synchronous power rectifier of claim 5, wherein
said means to selectively apply comprises a plurality of diodes, each connected from the inductor secondary to each first semiconductor device.

* * * * *